United States Patent [19]

Yoshihara et al.

[11] Patent Number: 4,926,451
[45] Date of Patent: May 15, 1990

[54] TIMING CONTROLLER FOR HIGH-SPEED DIGITAL INTEGRATED CIRCUIT

[75] Inventors: Kunio Yoshihara, Kawasaki; Toshiyuki Terada, Tokyo; Chiaki Takubo, Yokohama; Nobuo Koide, Tokyo; Shoichi Shimizu, Fujisawa, all of Japan

[73] Assignee: Kabushiki Kaisha Toshiba, Kawasaki, Japan

[21] Appl. No.: 259,905

[22] Filed: Oct. 19, 1988

[30] Foreign Application Priority Data

Oct. 19, 1987 [JP] Japan .................... 62-263138

[51] Int. Cl.$^5$ .................... H03B 19/00; H03K 21/00
[52] U.S. Cl. .................... 377/48; 377/118; 307/479; 307/271; 307/269; 328/15; 328/63
[58] Field of Search .......... 307/479, 269, 271; 328/15, 63, 140; 377/47–48, 118–121, 110

[56] References Cited

U.S. PATENT DOCUMENTS 3,896,387 7/1975 Kokado .................... 377/48
4,031,476 7/1977 Goldberg .................... 377/48
4,041,403 8/1977 Chiapparoli, Jr. .................... 377/48

OTHER PUBLICATIONS

IEEE GaAs IC Symposium 1986; "High Yield and Low Power Multiplexer/Demultiplexer by SCFL"; Hasegawa et al. (pp. 147–150).
IEICE National Convention Record; "Design of Gbit/s Multiplexer and Demultiplexer IC's"; N. Koide et al.; Record No. 399, pp. 2-203; 1987.
(IEICE Technical Report); "A GaAs Multiplexer and Demultiplexer Chip-Set for Gbit/s Optical Fiber Transmission System"; A. Kameyama et al.; ED86-152 (1987).

Primary Examiner—Stanley D. Miller
Assistant Examiner—Timothy P. Callahan
Attorney, Agent, or Firm—Oblon, Spivak, McClelland, Maier & Neustadt

[57] ABSTRACT

There is disclosed a digital integrated circuit device which has high-speed transistors of a selected type. A timing controller is incorporated in this device and performs timing control for an internal digital circuit. The timing controller includes a series-circuit of two flip-flop circuits serving as a frequency-dividing circuit for frequency-dividing a reference clock signal and generating an internal timing signal, and a switch circuit connected to a signal feedback line of these flip-flop circuits. In a normal mode, the switch circuit supplies the internal timing signal output from the flip-flop circuits to the digital integrated circuit. At a desired timing, the switch circuit performs a switching operation in response to a control signal, electrically disconnects the signal feedback line of the flip-flop circuits, and alternatively supplies an external timing signal externally supplied thereto to the digital integrated circuit.

11 Claims, 8 Drawing Sheets

TIMING CONTROLLER FOR HIGH-SPEED DIGITAL INTEGRATED CIRCUIT

BACKGROUND OF THE INVENTION

1. Field of the Invention

The present invention relates to a high-speed digital integrated circuit device and, more particularly, to a timing controller for generating an RF timing signal for a digital integrated circuit having transistors which operate at high speed on the gigahertz order.

2. Description of the Related Art

With the increasing needs for high performance of large digital systems, the technique for increasing operation speeds of highly integrated electronic components such as ICs and LSIs becomes indispensable. Especially in digital communication systems, very high-speed digital ICs such as multiplexers and demultiplexers including GaAs Schottky gate FETs (or GaAs MESFETs) and capable of operating on the gigahertz order have been required.

Such very high-speed digital ICs must incorporate therein a timing controller for receiving an RF clock signal and generating a necessary synchronous signal. However, a conventional timing controller suffers from a problem that it is very difficult to supply, to a transistor internal IC, a synchronous signal which accurately synchronizes with the transistor internal IC operating at high speed in the same phase and at a desired timing on the basis of a clock signal having a desired radio frequency (e.g., a pulse width of the signal is about several hundred picoseconds). In order to solve this problem, a reset circuit is additionally formed. The reset circuit adequately resets the timing controller so that the RF clock signal can synchronize with the internal IC in the same phase at a desired timing.

Such a digital IC having a reset function poses another problem that its circuit arrangement is complicated, since a considerably large number of transistors are used to constitute the reset circuit. In addition, this reset circuit is not suitable for a digital IC which operates at very high speed, since a signal transfer delay in its signal wiring interferes with accurate setting of a reset pulse and it becomes difficult to precisely control a reset interval.

SUMMARY OF THE INVENTION

It is therefore an object of the present invention to provide a new and improved timing controller, suitable for digital IC devices capable of operating at high speed, and having high performance and a simple circuit arrangement.

In accordance with the above object, the present invention is addressed to a specific digital IC device, which comprises a digital integrated circuit constituted by selected high-speed active elements and a timing controller connected to the digital integrated circuit. The timing controller includes a switch circuit for receiving an external timing signal which is externally generated so as to synchronize with a reference clock signal and performing a switching operation at a desired timing, thereby supplying the external timing signal to the digital integrated circuit at a desired timing. Typically, the timing controller further includes a frequency-dividing circuit for generating an internal timing signal. In this case, the switch circuit is connected to the frequency-dividing circuit and selectively supplies the internal and external timing signals to the digital integrated circuit.

The present invention and its objects and advantages will become more apparent in a detailed description of preferred embodiments to be presented below.

BRIEF DESCRIPTION OF THE DRAWINGS

In the detailed description of a preferred embodiment of the invention presented below, reference is made to the accompanying drawing of which.

DETAILED DESCRIPTION OF THE PREFERRED EMBODIMENTS

Prior to a description of embodiments of the present invention, a conventional digital integrated circuit (IC) including a timing controller will be described below for better understanding of the present invention. A conventional digital IC shown in FIG. 1 is a 4-bit multiplexer, typically applied to a high-speed digital communication system using optical fibers, and constituted using a GaAs Schottky gate FETs (to be abbreviated to "GaAs MESFETs" hereinafter) or high-speed bipolar transistors.

Figure 1:
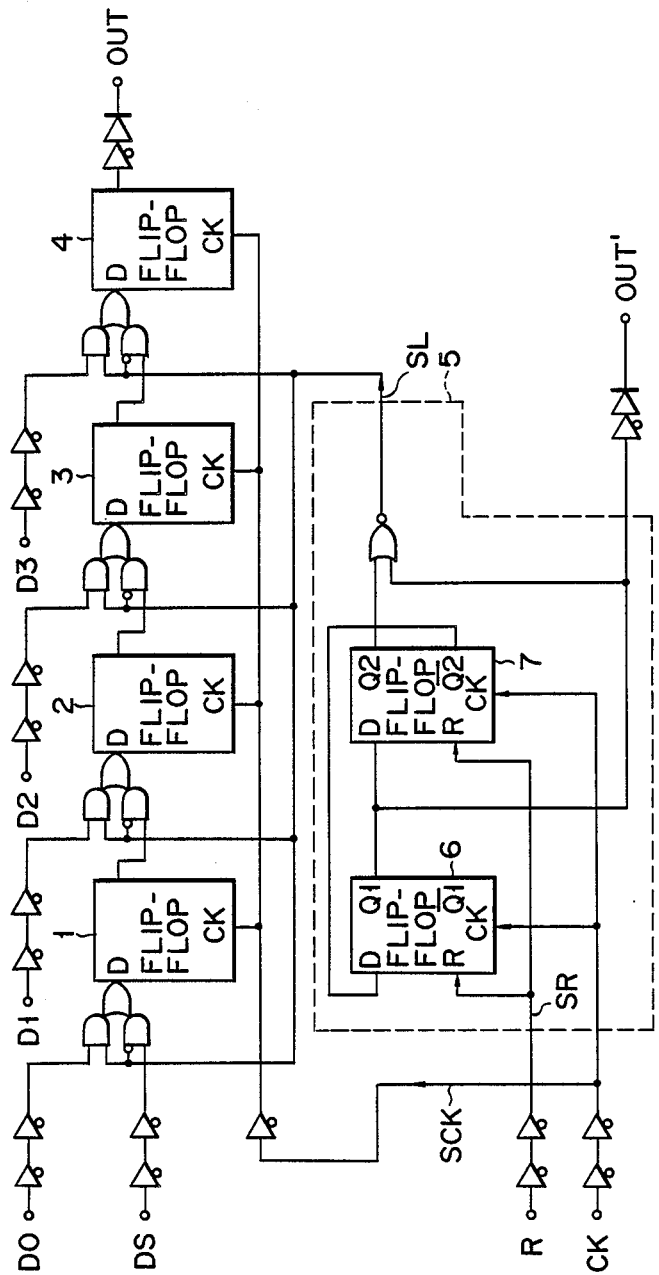
FIG. 1 is a circuit diagram showing a circuit arrangement of a 4-bit multiplexer which is a digital IC including a conventional timing controller.

As shown in FIG. 1, this multiplexer has a shift register constituted by cascading four flip-flop circuits 1, 2, 3, and 4. The shift register has a parallel-load serial-out function. The parallel load function is repeated each period corresponding to a shift stage (i.e., every four clocks in this case), thereby combining four input signals D0, D1, D2, and D3 into one output signal. In other words, the circuit shown in FIG. 1 is a "4 : 1 multiplexer".

Timing controller 5 is provided to control timings for transferring the four input signals to an internal circuit of the shift register. Controller 5 frequency-divides clock signal SCK externally supplied to clock input terminal CK and generates load signal SL. Signal SL is supplied to circuits 1, 2, 3, and 4 as synchronous signals. Signal SCK is supplied to circuits 1, 2, 3, and 4.

When load signal SL changes in potential to have a different logic level, e.g., when a potential level of signal SL changes from logic "L" to "H", input signal D3 appears at output terminal OUT of the shift register. Thereafter, input signals D2, D1, and D0 sequentially appear at terminal OUT in synchronism with clock signal SCK. Controller 5 accurately controls timings of the signals sequentially output at terminal OUT so that the input signal accurately synchronizes with a desired timing.

Figure 2:
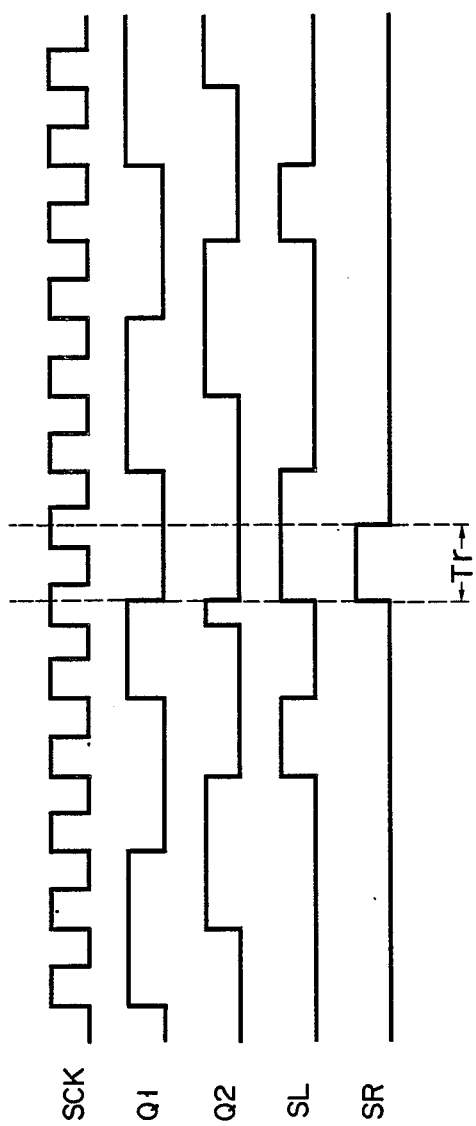
FIG. 2 is a diagram showing waveforms of main signals generated in main portions of the circuit arrangement shown in FIG. 1.

As shown in FIG. 1, timing controller 5 includes two D type flip-flop circuits 6 and 7 having a reset function. In controller 5, two flip-flop circuits 6 and 7 are reset in response to reset signal SR externally supplied to reset terminal R. At this time, outputs Q1 and Q2 from flip-flop circuits 6 and 7 go to logic level "L", and controller 5 generates load signal SL. For example, when signal SR has logic level "H" during interval Tr as shown in FIG. 2, flip-flop circuits 6 and 7 are kept reset during interval Tr, and signal SL is supplied to circuits 1, 2, 3, and 4 in the shift register. When reset is released, the shift register normally operates. Therefore, a timing of pulse generation of the load signal is offset by reset interval Tr. In other words, by adequately changing the reset pulse generation interval, generation timings of signals D0, D1, D2, and D3 at output terminal OUT can be adjusted and desirably synchronized with each other.

According to the above conventional timing controller, however, it is very difficult to accurately control the generation timing of the reset pulse. The multiplexer shown in FIG. 1 is typically applied to a high-speed digital communication system as described above and therefore is arranged to operate at high speed of at least one gigahertz. In such a digital circuit operating at high speed on the gigahertz order, a signal transfer delay in wiring cannot be ignored. It is very difficult for current mounting techniques to supply the reset pulse signal to the shift register at high speed while compensating for the signal transfer delay in the circuit. In particular, it is very difficult to precisely and rapidly control reset interval Tr in consideration of phase synchronization between clock signal SCK and load signal SL.

In addition, since controller 5 includes flip-flop circuits 6 and 7 having a reset function, the number of elements required to constitute controller 5 is undesirably increased. When the number of transistors of circuits 6 and 7 is increased, a gate capacitance is increased accordingly. As a result, not only a circuit arrangement of controller 5 is complicated, but also its maximum operation frequency is reduced. This is a fatal drawback for very high-speed digital IC devices.

The above problems of the conventional digital IC devices can be effectively solved by embodiments of the present invention to be described below.

Figure 3:
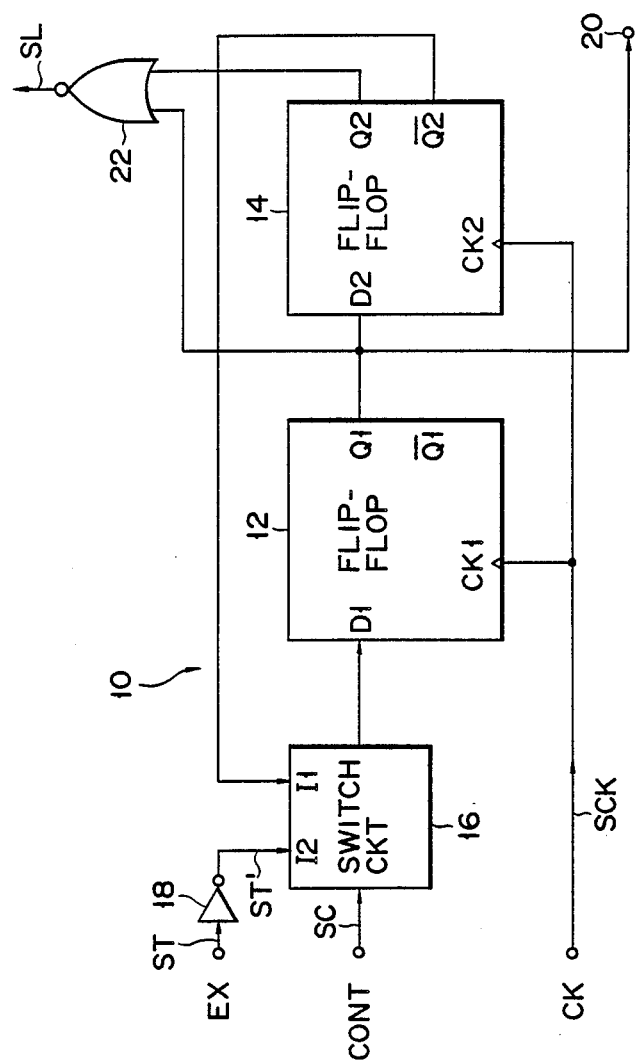
FIG. 3 is a circuit diagram showing a timing controller according to a preferred embodiment of the present invention.

Referring now to FIG. 3, a timing controller according to a preferred embodiment of the present invention is generally designated by reference numeral "10". Controller 10 (sometimes called simply as a "timing circuit") is applied to the high-speed digital IC device shown in FIG. 1 in place of the above conventional timing controller. As shown in FIG. 3, controller 10 includes a $\frac{1}{4}$ frequency-dividing circuit (known as a Johnson counter) constituted by cascading two D type flip-flop circuits 12 and 14 and receives at clock inputs CK1 and CK2 clock signal SCK externally supplied from signal terminal CK. Flip-flop circuits 12 and 14 frequency-divide signal SCK in accordance with a manner to be described below and generate a synchronous signal (to be referred to as a "load signal SL"). Signal SL is supplied to the shift register described above with reference to FIG. 1.

Switch circuit 16 is formed in such a manner that circuit 16 is connected to a feedback path from output $\overline{Q2}$ of second flip-flop circuit 14 to input D1 of first flip-flop circuit 12. Flip-flop circuit 16 performs a switching operation in response to control signal SC externally supplied to terminal CONT and selectively generates from its output input signals received at first and second inputs I1 and I2 thereof. As shown in FIG. 3, switch circuit 16 is connected at input I1 to output $\overline{Q2}$ of flip-flop circuit 14. Switch circuit 16 is also connected at input I2 to synchronous signal input terminal EX through inverter 18. Timing signal ST is externally supplied to terminal EX. Signal ST has a pulse period four times that of signal SCK. Signal ST is phase-inverted by inverter 18 to generate phase-inverted timing signal ST'. Therefore, in a first switching state, switch circuit 16 feeds back the output from flip-flop circuit 14 at a subsequent stage to the input of flip-flop circuit 12 at a previous stage; and in a second switching state, it inhibits the above feed-back and supplies signal ST' to input D1 of flip-flop circuit 12.

Figure 4:
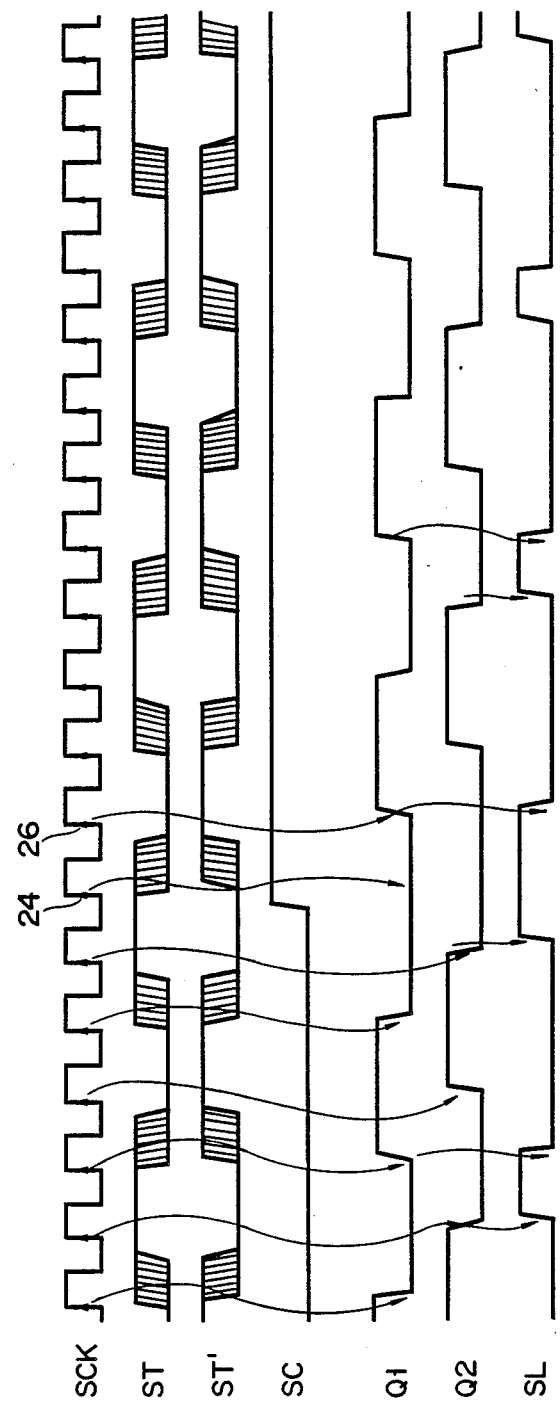
FIG. 4 is a diagram showing waveforms of main signals or potential changes generated in main portions of the circuit arrangement shown in FIG. 3.

When signal SC has logic level "L" as shown in FIG. 4, switch circuit 16 renders the feedback path from flip-flop 14 to flip-flop 12 electrically conductive, and therefore controller 10 operates as a normal $\frac{1}{4}$ frequency-dividing circuit. That is, controller 10 is self-synchronized regardless of reception of the external synchronous signal or timing signal ST and produces load signal SL having a period of four clocks as an internal synchronous signal. At this time, the potential of output Q1 of flip-flop 12 falls from logic level "H" to "L" in response to a leading edge change from logic level "L" to "H" of signal SCK and is maintained only for an interval corresponding to the two clocks. The potential of output Q1 of flip-flop 12 appears at terminal 20. As indicated by reference numeral "Q2" in FIG. 4, a potential change at output Q1 of flip-flop 12 is shifted from that at output Q2 of flip-flop 12 by a time interval of one clock. A period of the potential change at output Q2 of flip-flop 14 is the same as that at output Q1 of circuit 12 and corresponds to four clocks.

These output signals are transferred to NOR gate 22 and converted into load signal SL therein. As shown in FIG. 4, signal SL has a "turn-on pulse" corresponding to one clock. In other words, only while output signals Q1 and Q2 from flip-flop circuits 12 and 14 simultaneously fall to logic level "L", signal SL has logic level "H".

When signal SC changes to have logic level "H" as shown in FIG. 4, circuit 16 electrically disconnects the feedback path from flip-flop 14 to flip-flop 12 and supplies external timing signal ST' to input D1 of flip-flop 12. At this time, controller 10 starts a retiming operation. More specifically, flip-flop 12 at the previous stage resynchronizes output signal Q1 thereof with clock signal SCK in response to signal ST'. Signal Q1 of flip-flop 12 changes from logic level "L" to "H" in synchronism with subsequent level change 26 of the components of signal SCK. In response to this change, signal SL automatically changes from logic level "H" to "L". Therefore, as shown in FIG. 4, an interval during which logic level "H" of signal SL is maintained is irregular before and after the level change of signal SC. Thereafter, an internal operation of timing controller 10 is the same as described above. By only supplying a rectangular signal having a period four times that of clock signal SCK as external timing signal ST' to flip-flop circuit 12 by switch circuit 16, load signal SL which maintains a desired phase relationship with timing signal ST can be easily obtained.

According to the above embodiment, the flip-flop circuits which constitute timing controller 10 need not have a reset function, unlike in the conventional apparatus. Therefore, the circuit of this embodiment are free from the problems such as difficulty in generation of an RF reset pulse, transfer delay of the RF reset pulse on signal wiring, and difficulty in matching phases of the reset pulse and RF clock signal SCK from which the conventional circuit described above suffers.

Timing signal ST to be externally supplied to controller 10 of this embodiment may be a simple square waveform signal having a duty ratio of 50% (therefore, this signal can be easily generated by a conventional simple circuit arrangement). Such a pulse signal having the duty ratio of 50% can be easily transmitted even if its frequency is very high. In addition, after controller 10 starts the "retiming operation" in response to a level change in control signal SC, accurate synchronization can be automatically obtained without performing phase shifting adjustment for synchronizing load signal SL with clock signal SCK.

Figure 5:
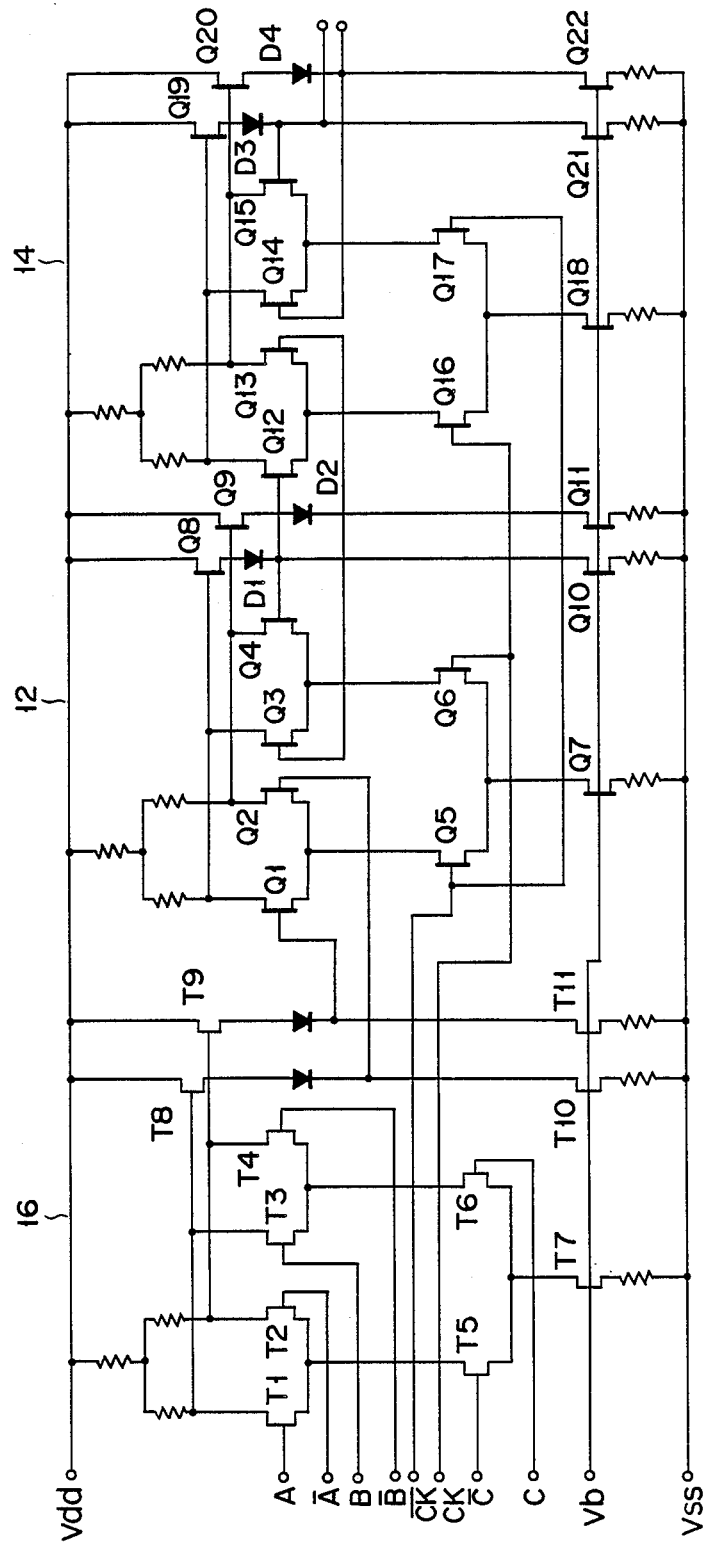
FIG. 5 is a circuit diagram showing a detailed arrangement of the timing controller shown in FIG. 3.

Timing controller 10 may be fabricated using GaAs MESFETs Q1 to Q22 and conventional bipolar transistors T1 to T11 as shown in FIG. 5. In this circuit arrangement, terminals A and $\overline{A}$ are used as feedback terminals, terminals B and $\overline{B}$ are used as external timing signal input terminals, and terminals C and $\overline{C}$ are used as control signal input terminals.

Figure 6:
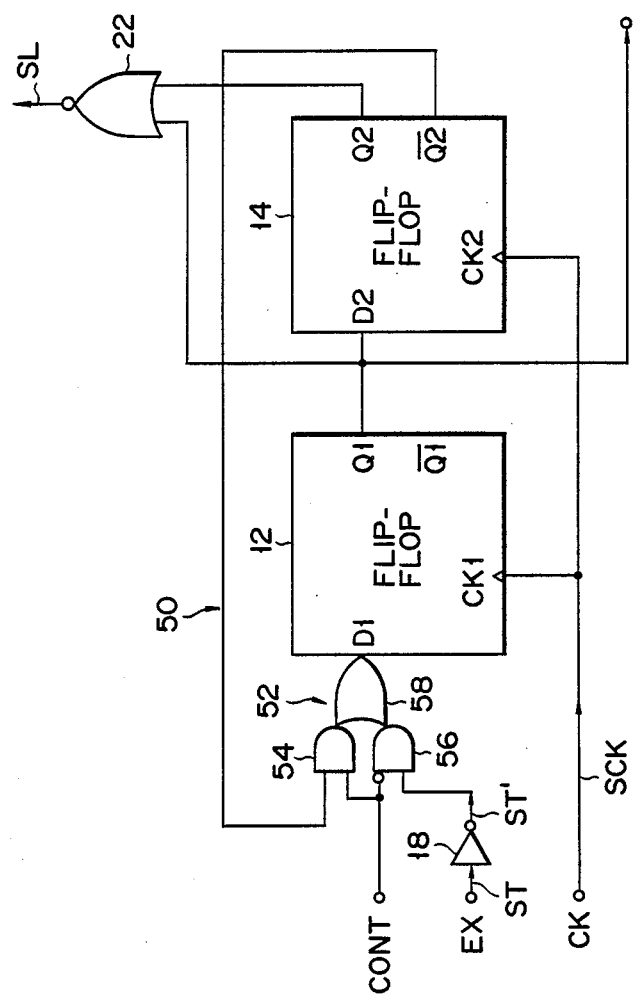
FIG. 6 is a circuit diagram showing a timing controller according to another embodiment of the present invention.

The above embodiment may be modified as shown in FIG. 6, wherein timing controller 50 has gate circuit 52 constituted by two AND gates 54 and 56 and OR gate 58. Gate circuit 52 is substantially incorporated in flip-flop circuit 12 at a first stage. However, in FIG. 6, gate circuit 52 is separately illustrated for better understanding. Circuit 52 having such a gate arrangement is suitably used when flip-flop circuits 12 and 14 are constituted by a Source-Coupled FET Logic (SCFL) using GaAs FETs or an Emitter-Coupled Logic (ECL) using bipolar transistors.

Figure 7:
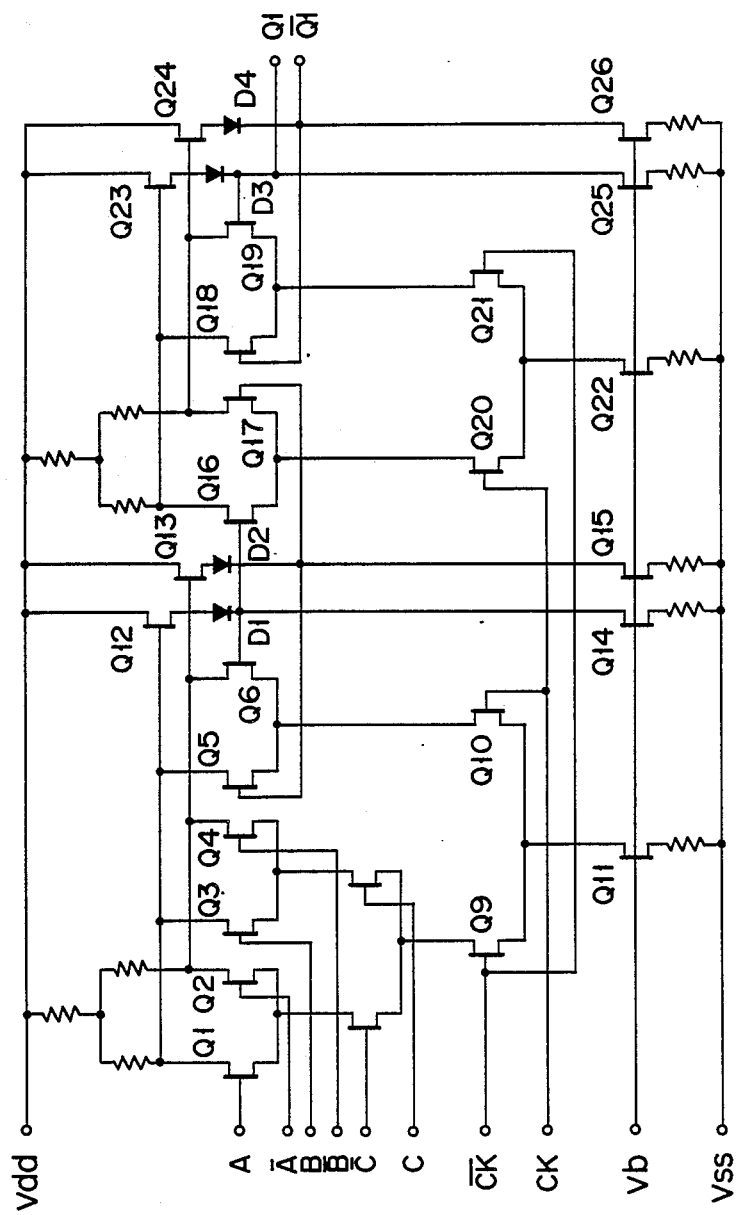
FIG. 7 is a circuit diagram showing a detailed arrangement of the timing controller shown in FIG. 6.

As shown in FIG. 7, the circuit arrangement shown in FIG. 6 may be designed using GaAs MESFETs. In FIG. 7, a circuit basically comprises a master/slave flip-flop circuit obtained by cascading differential circuits. As is apparent from FIG. 7, switch circuit 52 is substantially incorporated in flip-flop circuit 12 at the first stage. More specifically, switch circuit 52 includes first and second differential circuits. The first differential circuit is constituted by MESFETs Q3 and Q4 parallelly connected to a transfer gate differential circuit corresponding to a master flip-flop and consisting of MESFETs Q1 and Q2. The second differential circuit is constituted by MESFETs Q7 and Q8 and serves to alternately switch the first differential circuit and the transfer gate differential circuit. In the circuit arrangement shown in FIG. 7, terminals A and $\overline{A}$ are feedback terminals, terminals B and $\overline{B}$ are input terminals for receiving the external synchronous terminal signal, and terminals C and $\overline{C}$ are control terminals.

With such a circuit arrangement, generation of the internal timing signal and inputting of the external timing signal as described above with reference to the first embodiment can be effectively switched. Especially, according to this embodiment, switch circuit 52 is substantially incorporated in the flip-flop circuit arrangement, elements required for the circuit arrangement can be decreased in number as a whole. As a result, adverse influences such as a gate capacitance can be restricted, and an operation speed of the IC can be improved.

Figure 8:
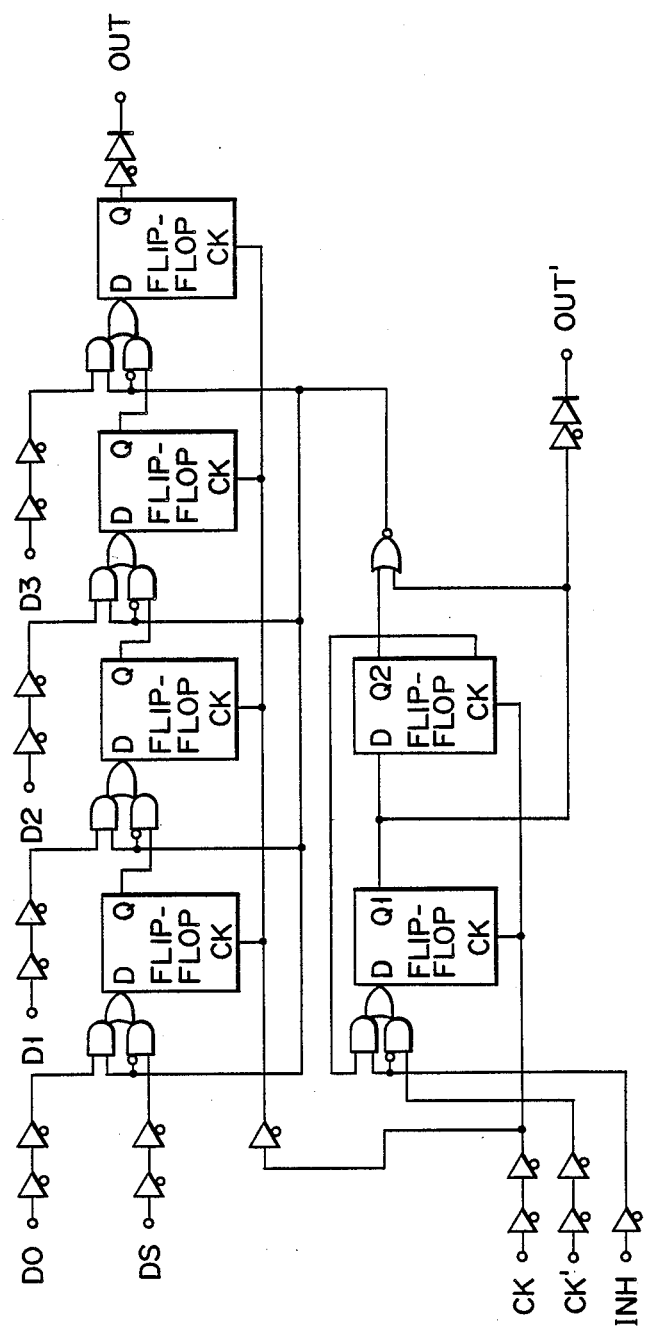
FIG. 8 is a circuit diagram showing a circuit arrangement of a 4-bit multiplexer which is a digital IC including the timing controller shown in FIG. 6.

FIG. 8 generally shows a digital IC constituted using timing controller 50 shown in FIG. 6. In this circuit arrangement, terminal INH corresponds to control terminal CONT in FIG. 6, whereas ½ clock terminal CK' corresponds to external synchronous signal input terminal EX in FIG. 6.

Although the invention has been described with reference to a specific embodiment, it shall be understood by those skilled in the art that numerous modifications may be made that are within the spirit and scope of the inventive contribution.

The timing controller according to the present invention can be widely applied regardless of the type of semiconductor elements constituting a digital IC or the type of digital IC. For example, the timing controller of the present invention can be applied to a digital IC constituted by high-speed compound semiconductor elements such as HEMT type transistors or HBT type transistors. In addition, the timing controller of the present invention can be applied to a digital IC of ECL or CML constituted by silicon bipolar transistors. Furthermore, the timing controller of the present invention can be applied not only to the multiplexer described above but also to other types of digital ICs which require similar timing synchronization.

What is claimed is:

1. A timing controller in a digital integrated circuit, said circuit including a selected type of active elements, said timing controller comprising:
a frequency dividing circuit for receiving a reference clock signal and for generating a first timing signal, said first timing signal being received by said digital integrated circuit as an internal timing signal, said frequency dividing circuit having an input and an output; and
switch circuit means connected to said output and said input of the said frequency dividing circuit, said switch circuit means further receiving a control signal and a second timing signal as an external timing signal, said switch circuit means being switched between two positions in response to the control signal so that in a first position said switch circuit means connects the output of said frequency dividing circuit to the input of said frequency dividing circuit as a signal feedback line, and in a second position connects the second timing circuit to the input of the frequency dividing circuit so that said frequency dividing circuit is controlled by said second timing signal.

2. The timing controller according to claim 1 wherein said frequency dividing circuit comprises a series connection of first and second flip-flop circuits.

3. The timing controller according to claim 2, wherein said second timing circuit has a square wave form and is in synchronism with said reference clock signal.

4. The timing controller according to claim 3 wherein said switch circuit means comprises a gate circuit having active elements of said selected type.

5. The timing controller according to claim 4 wherein said active elements are gallium arsenide field effect transistors.

6. The timing controller according to claim 4, wherein said gate circuit controls the connection of an output signal from the second flip-flop circuit to the input of the first flip-flop circuit.

7. A high-speed digital integrated circuit device comprising:

an integrated circuit including gallium arsenide transistors operating at a gigahertz rate;

a frequency dividing circuit receiving a reference clock signal and frequency dividing said reference clock signal to produce a first timing signal which is supplied to said integrated circuit as an internal timing signal, said frequency dividing circuit including first and second cascaded flip-flops; and switch circuit means including gallium arsenide transistors connected to the output of said second flip-flop and the input of said first flip-flop in a signal feedback line, said switch circuit means receiving a control signal and a second timing signal which is externally supplied, said switch circuit means being switched between two positions in response to the control signal so that in first position said switch circuit means connects the output of said second flip-flop to the input of the first flip-flop so as a feedback line, and in a second position connects the input of said first flip-flop with the second timing signal.

8. The device according to claim 7, further comprising invertor means connected to said switch circuit means for receiving said external timing signal to produce an inverted timing signal which is applied to said switch circuit means.

9. The device according to claim 7, wherein said digital integrated circuit includes a multiplexer.

10. The device according to claim 7, wherein said digital integrated circuit includes a demultiplexer.

11. The device according to claim 7, wherein said transistors include Schottky gate field effect transistors.

* * * * *